US007998360B2

(12) United States Patent
Takeda et al.

(10) Patent No.: US 7,998,360 B2
(45) Date of Patent: Aug. 16, 2011

(54) ELECTROLYSIS SOLUTION FOR ELECTROLYTIC CAPACITOR, AND ELECTROLYTIC CAPACITOR

(75) Inventors: Masayuki Takeda, Mie (JP); Hiroo Miyauchi, Mie (JP); Masashi Ozawa, Tokyo (JP)

(73) Assignees: Mitsubishi Chemical Corporation, Tokyo (JP); Nippon Chemi-Con Corporation, Tokyo (JP)

( * ) Notice: Subject to any disclaimer, the term of this patent is extended or adjusted under 35 U.S.C. 154(b) by 715 days.

(21) Appl. No.: 12/088,696

(22) PCT Filed: Sep. 29, 2006

(86) PCT No.: PCT/JP2006/319508
§ 371 (c)(1),
(2), (4) Date: Mar. 31, 2008

(87) PCT Pub. No.: WO2007/037396
PCT Pub. Date: Apr. 5, 2007

(65) Prior Publication Data
US 2009/0034160 A1    Feb. 5, 2009

(30) Foreign Application Priority Data

Sep. 30, 2005 (JP) ................... 2005-288961
Sep. 30, 2005 (JP) ................... 2005-288964
Sep. 30, 2005 (JP) ................... 2005-288965
Sep. 30, 2005 (JP) ................... 2005-288966

(51) Int. Cl.
*H01G 9/04* (2006.01)

(52) U.S. Cl. ....... 252/62.2; 361/504; 361/505; 361/503; 361/509; 361/511; 361/520; 361/516

(58) Field of Classification Search ............ 252/52.2; 361/504, 505, 503, 509, 511, 520, 516
See application file for complete search history.

(56) References Cited

U.S. PATENT DOCUMENTS

| 7,227,738 B2 * | 6/2007 | Takeda et al. ........... 361/503 |
| 7,256,983 B2 * | 8/2007 | Ozawa et al. ........... 361/519 |
| 2004/0095708 A1 * | 5/2004 | Takeda et al. ........... 361/504 |

FOREIGN PATENT DOCUMENTS

| JP | 62 114206 | | 5/1987 |
| JP | 4 142725 | | 5/1992 |
| JP | 5 144677 | | 6/1993 |
| JP | 8 293437 | | 11/1996 |
| JP | 9 115782 | | 5/1997 |
| JP | 10 112422 | | 4/1998 |
| JP | 2002 100398 | | 4/2002 |
| JP | 2003 22938 | | 1/2003 |
| JP | 2003 142346 | | 5/2003 |
| JP | 2003 309044 | | 10/2003 |
| JP | 2005 13929 | | 1/2005 |
| JP | 2005 167246 | | 6/2005 |
| WO | WO 2004/040605 | * | 5/2004 |
| WO | WO 2004/042757 | * | 5/2004 |

OTHER PUBLICATIONS

Derwent citatation for WO 2004/042757.*

* cited by examiner

*Primary Examiner* — C. Melissa Koslow
(74) *Attorney, Agent, or Firm* — Oblon, Spivak, McClelland, Maier & Neustadt, L.L.P.

(57) ABSTRACT

Provided is an electrolyte containing tetrafluoroaluminate ions, which is advantageous in that the electrolyte can be prevented from leaking from both the cathode and the anode in an electrolytic capacitor.

An electrolyte for electrolytic capacitor, which comprises: (A) a tetrafluoroaluminate ion, and (B) at least one compound selected from the group consisting of: (1) at least one compound selected from the group consisting of a phthalimide, a quinoline, a dioxime, a nitrophenol and an amino group-containing aromatic carboxylic acid; (2) at least one compound selected from the group consisting of an aluminum complex, a boric acid ester and a silicic acid ester; (3) at least one compound selected from the group consisting of a monocyclic quinone compound and a bicyclic quinone compound; (4) a tricyclic or higher polycyclic quinone compound; and (5) at least one compound selected from a heteropoly acid and a salt thereof, an electrolyte for electrolytic capacitor containing a tetrafluoroaluminate ion, which has a self-potential of −0.95 V or more with respect to aluminum in the electrolyte, relative to an $I_3^-/I^-$ reference electrode, and
an electrolytic capacitor using the same.

32 Claims, 1 Drawing Sheet

ELECTROLYSIS SOLUTION FOR ELECTROLYTIC CAPACITOR, AND ELECTROLYTIC CAPACITOR

FIELD OF THE INVENTION

The present invention relates to an electrolyte containing a tetrafluoroaluminate ion for use in an electrolytic capacitor and an electrolytic capacitor using the electrolyte.

BACKGROUND ART

An electrolytic capacitor has a characteristic feature in that it has a small size and a large electrostatic capacity, and it is widely used in low frequency filter and bypass. The electrolytic capacitor generally has a structure comprising an anode foil and a cathode foil being spirally wound together with a separator disposed between the anode foil and the cathode foil, and the resultant assembly is contained and sealed in a casing. As an anode foil, a metal such as aluminum or tantalum, having formed thereon an insulating oxide film as a dielectric layer is used. As a cathode foil, an etched aluminum foil is generally used. The separator disposed between the anode and the cathode is impregnated with an electrolyte and functions as a true cathode. Therefore, the electrolyte is an important constituent that directly affects the properties of the electrolytic capacitor.

Recently, as an electrolyte for electrolytic capacitor, having high electrolytic conductivity and excellent thermal stability as well as high voltage proof, an electrolyte for electrolytic capacitor containing a tetrafluoroaluminate ion has been proposed (see, for example, patent document 1).

However, in studies made on the electrolytic capacitor using the electrolyte a containing tetrafluoroaluminate ion, it has been found that the electrolytic capacitor has not only the problem of electrolyte leakage from the cathode, which has conventionally been pointed out, but also a problem of electrolyte leakage from the anode in the strict meaning, which has conventionally been considered not to occur.

Patent document 1: Japanese Unexamined Patent Publication No. 2003-142346

DISCLOSURE OF THE INVENTION

Problems to be Solved by the Invention

The present inventors have found that, by solving the problem of electrolyte leakage from both the cathode and the anode, the electrolytic capacitor using an electrolyte containing a tetrafluoroaluminate ion can be further improved in properties, and the present invention has been completed.

Means to Solve the Problems

The present invention is directed to an electrolyte for an electrolytic capacitor, which comprises:
(A) a tetrafluoroaluminate ion, and
(B) at least one compound selected from the group consisting of:
(1) at least one compound selected from the group consisting of a phthalimide, a quinoline, a dioxime, a nitrophenol and an amino group-containing aromatic carboxylic acid;
(2) at least one compound selected from the group consisting of an aluminum complex, a boric acid ester and a silicic acid ester;
(3) at least one compound selected from the group consisting of a monocyclic quinone compound and a bicyclic quinone compound;
(4) a tricyclic or higher polycyclic quinone compound; and
(5) at least one compound selected from a heteropoly acid and a salt thereof.

The present invention is directed to the above electrolyte for an electrolytic capacitor, which comprises:
(A) a tetrafluoroaluminate ion, and
(B) at least one compound selected from the group consisting of:
(1) at least one compound selected from the group consisting of a phthalimide, a quinoline, a dioxime, a nitrophenol and an amino group-containing aromatic carboxylic acid; and
(2) at least one compound selected from the group consisting of an aluminum complex, a boric acid ester and a silicic acid ester.

The present invention is directed to the above electrolyte for an electrolytic capacitor, which comprises:
(A) a tetrafluoroaluminate ion, and
(B) at least one compound selected from the group consisting of:
(3) at least one compound selected from the group consisting of a monocyclic quinone compound and a bicyclic quinone compound;
(4) a tricyclic or higher polycyclic quinone compound; and
(5) at least one compound selected from a heteropoly acid and a salt thereof.

The present invention is directed to an electrolyte for an electrolytic capacitor containing a tetrafluoroaluminate ion, which has a self-potential of −0.95 V or more with respect to aluminum in the electrolyte, relative to an $I_3^-/I^-$ reference electrode.

The present invention is directed to an electrolytic capacitor comprising: a capacitor element which comprises an anode foil with an anode lead means and a cathode foil with a cathode lead means being spirally wound together with a separator disposed therebetween, the capacitor element being impregnated with any one of the above electrolyte; a casing for containing therein the capacitor element; and a closure for sealing up an opening portion of the casing.

Effect of the Invention

By the electrolyte of the present invention, there can be obtained an electrolytic capacitor which is advantageous in that the electrolyte is remarkably prevented from leaking not only from the cathode but also from the anode.

DESCRIPTION OF REFERENCE NUMERALS

Figure 1:
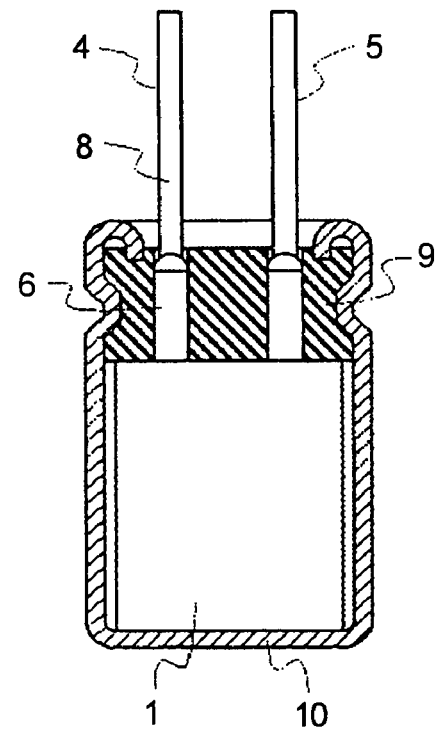
FIG. 1 Cross-sectional view showing the inner structure of an electrolytic capacitor.

Reference numerals in the drawings are as follows.

| | |
|---|---|
| 1: | Capacitor element |
| 2: | Anode foil |
| 3: | Cathode foil |
| 4: | Lead wire for anode lead |
| 5: | Lead wire for cathode lead |

-continued

| | |
|---|---|
| 6: | Round bar portion |
| 7: | Connector |
| 8: | External connector |
| 9: | Closure |
| 10: | Casing |
| 11: | Separator |

BEST MODE FOR CARRYING OUT THE INVENTION

The present invention is directed to an electrolyte obtained by incorporating into an electrolyte for an electrolytic capacitor containing a tetrafluoroaluminate ion, (B)(1) at least one compound selected from the group consisting of a phthalimide, a quinoline, a dioxime, a nitrophenol and an amino group-containing aromatic carboxylic acid. It is presumed that the above substance adsorbs on the cathode and anode in an electrolytic capacitor and inhibits a reaction at the interface on each electrode to prevent the electrolyte from leaking from the cathode and anode.

The phthalimide means phthalimide or a derivative thereof. Specific examples include compounds represented by the following formula (1):

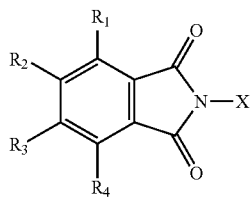

wherein X represents hydrogen, an alkyl group, a hydroxyl group, an alkoxy group or an alkylthio group, and each of $R_1$ to $R_4$ independently represents hydrogen, an alkyl group or a hydroxyl group.

Examples of alkyl groups for X include linear or branched alkyl groups having 1 to 4 carbon atoms, such as a methyl group, an ethyl group and a propyl group, and cycloalkyl groups having 3 to 6 carbon atoms, such as a cyclohexyl group. With respect to the alkoxy group or alkylthio group for X, as examples of the alkyl group portions, there can be mentioned the above examples of alkyl groups for X.

Examples of alkyl groups for $R_1$ to $R_4$ include linear or branched alkyl groups having 1 to 4 carbon atoms, such as a methyl group, an ethyl group and a propyl group.

The phthalimide is preferably N-hydroxyphthalimide or N-(cyclohexylthio)phthalimide.

The quinoline means quinoline or a derivative thereof. Specific examples include compounds represented by the following formula (2):

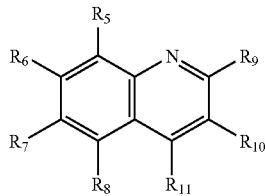

wherein each of $R_5$ to $R_8$ independently represents hydrogen, an alkyl group or a hydroxyl group, and each of $R_9$ to $R_{11}$ independently represents hydrogen, an alkyl group, an alkenyl group or a hydroxyl group, and two adjacent substituents in $R_9$ to $R_{11}$ together with the carbon atoms to which they are bonded may form a ring structure.

Examples of alkyl groups for $R_5$ to $R_8$ include linear or branched alkyl groups having 1 to 4 carbon atoms, such as a methyl group, an ethyl group and a propyl group.

Examples of alkyl groups for $R_9$ to $R_{11}$ include linear or branched alkyl groups having 1 to 4 carbon atoms, such as a methyl group, an ethyl group and a propyl group. Examples of alkenyl groups for $R_9$ to $R_{11}$, include linear or branched alkenyl groups having 2 to 4 carbon atoms, such as an ethenyl group and a propenyl group.

When two adjacent substituents in $R_9$ to $R_{11}$ together with the carbon atoms to which they are bonded form a ring structure, examples of ring structures include 3- to 7-membered carbocycles or heterocycles. The carbocycle or heterocycle may be either saturated or unsaturated, and may be substituted by, for example, an alkyl group or a hydroxyl group. Examples of alkyl groups include linear or branched alkyl groups having 1 to 4 carbon atoms, such as a methyl group, an ethyl group and a propyl group.

The quinoline is preferably 8-hydroxyquinoline or acridine.

The dioxime means a compound containing two >C=NOH groups. Examples of dioximes include glyoxime and derivatives thereof, benzoquinone dioxime and derivatives thereof, and cyclohexanedione dioxime and derivatives thereof. Examples of derivatives include dioximes substituted by, for example, an alkyl group, an aryl group (e.g., a phenyl group), or an amino group. Examples of alkyl groups include linear or branched alkyl groups having 1 to 4 carbon atoms, such as a methyl group, an ethyl group and a propyl group, and examples of aryl groups include aryl groups having 6 to 12 carbon atoms, such as a phenyl group.

Specific examples of dioximes include glyoxime, methylglyoxime, dimethylglyoxime, ethylmethylglyoxime, diethylglyoxime, diphenylglyoxime, diaminoglyoxime, 1,2-benzoquinone dioxime, 1,4-benzoquinone dioxime, 1,2-cyclohexanedione dioxime, and 1,4-cyclohexanedione dioxime, and preferred is dimethylglyoxime.

The nitrophenol means nitrophenol or a derivative thereof. Examples of derivatives include nitrophenols substituted by, for example, an alkyl group, an aryl group or an amino group. Examples of alkyl groups include linear or branched alkyl groups having 1 to 4 carbon atoms, such as a methyl group, an ethyl group and a propyl group, and examples of aryl groups include aryl groups having 6 to 12 carbon atoms, such as a phenyl group. In addition, examples include derivatives further substituted by a nitro group.

Specific examples of nitrophenols include o-, m-, p-nitrophenol, 3,5-dinitrophenol, 2,4-dinitrophenol, 2,6-dinitrophenol and 2,4,6-trinitrophenol, and preferred is p-nitrophenol.

The amino group-containing aromatic carboxylic acid means an aromatic carboxylic acid containing an amino group, and a preferred aromatic carboxylic acid is a monocarboxylic acid. Examples include benzoic acid containing an amino group, naphthoic acid containing an amino group, and derivatives thereof. Examples of derivatives include these carboxylic acids substituted by, for example, an alkyl group or an aryl group. Examples of alkyl groups include linear or branched alkyl groups having 1 to 4 carbon atoms, such as a methyl group, an ethyl group and a propyl group, and examples of aryl groups include aryl groups having 6 to 12 carbon atoms, such as a phenyl group.

Specific examples of amino group-containing aromatic carboxylic acids include o-, m-, p-aminobenzoic acid, 3-amino-2-naphthoic acid and 6-amino-2-naphthoic acid, and preferred is p-aminobenzoic acid.

The phthalimide, quinoline, dioxime, nitrophenol, and amino group-containing aromatic carboxylic acid can be used individually or in combination.

It is preferred that the amount of at least one compound selected from the group consisting of a phthalimide, a quinoline, a dioxime, a nitrophenol, and an amino group-containing aromatic carboxylic acid is 0.1 to 5% by weight, based on the total weight of the electrolyte. When the amount falls in this range, the electrolyte is sufficiently prevented from leaking from both the cathode and the anode. The amount is more preferably 0.2 to 4% by weight, further preferably 0.4 to 3% by weight.

The present invention is directed to an electrolyte obtained by incorporating into an electrolyte for an electrolytic capacitor containing a tetrafluoroaluminate ion, (B)(2) at least one compound selected from the group consisting of an aluminum complex, a boric acid ester and a silicic acid ester.

Examples of aluminum complexes include an acetylacetonato complex, an 8-quinolinolato complex, an ethylacetoacetato complex, an oxalato complex and a bis(ethylacetoacetato)(acetylacetonato) of aluminum. Preferred is an acetylacetonato complex or an 8-quinolinolato complex.

Examples of boric acid esters include alkyl esters of boric acid, such as lower alkyl esters having 1 to 6 carbon atoms of boric acid, and specific examples include trimethyl borate, triethyl borate, triisopropyl borate, tri-n-butyl borate, tri-t-butyl borate and tri-n-amyl borate. Preferred is triisopropyl borate or tri-n-amyl borate.

Examples of silicic acid esters include alkyl esters of silicic acid, such as lower alkyl esters having 1 to 6 carbon atoms of silicic acid, and specific examples include tetramethyl orthosilicate, tetraethyl orthosilicate, tetra-n-propyl orthosilicate and tetra-n-butyl orthosilicate. Preferred is tetraethyl orthosilicate.

The aluminum complex, boric acid ester, and silicic acid ester can be used individually or in combination.

It is preferred that the amount of at least one compound selected from the group consisting of an aluminum complex, a boric acid ester, and a silicic acid ester is 0.1 to 5% by weight, based on the total weight of the electrolyte. When the amount falls in this range, the electrolyte is sufficiently prevented from leaking from both the cathode and the anode. The amount is more preferably 0.2 to 4% by weight, further preferably 0.4 to 3% by weight.

The present invention is directed to an electrolyte obtained by incorporating into an electrolyte for an electrolytic capacitor containing a tetrafluoroaluminate ion, (B)(3) at least one compound selected from the group consisting of a monocyclic quinone compound and a bicyclic quinone compound.

The monocyclic quinone compound or bicyclic quinone compound means a compound obtained by changing two CH atomic groups of a monocyclic aromatic compound or bicyclic aromatic compound to CO atomic groups and moving the double bonds required to form a quinoid structure, or a derivative thereof.

Examples of monocyclic quinone compounds include benzoquinone and derivatives thereof, and specific examples include 1,2-benzoquinone and 1,4-benzoquinone, which are unsubstituted or substituted by an alkyl group, an aryl group, an alkoxy group, a hydroxyl group, an acyl group, an acyloxy group, a carboxyl group, or an unsubstituted or substituted amino group.

Examples of bicyclic quinone compounds include naphthoquinone and derivatives thereof, and specific examples include 1,4-naphthoquinone and 1,2-naphthoquinone, which are unsubstituted or substituted by an alkyl group, an aryl group, an alkoxy group, a hydroxyl group, an acyl group, an acyloxy group, a carboxyl group, or an unsubstituted or substituted amino group. Further examples include diphenoquinone and derivatives thereof, and specific examples include diphenoquinone which is unsubstituted or substituted by an alkyl group, an aryl group, an alkoxy group, a hydroxyl group, an acyl group, an acyloxy group, a carboxyl group, or an unsubstituted or substituted amino group.

Examples of benzoquinones and derivatives thereof include compounds represented by the following formula (I):

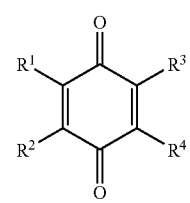

(I)

wherein each of $R^1$ to $R^4$ independently represents hydrogen, an alkyl group, an aryl group, an alkoxy group, a hydroxyl group, an acyl group, an acyloxy group, a carboxyl group, or an unsubstituted or substituted amino group.

Examples of naphthoquinones and derivatives thereof include compounds represented by the following formula (II):

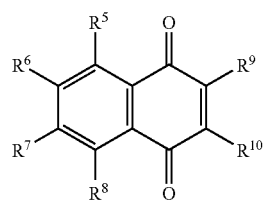

(II)

wherein each of $R^5$ to $R^{10}$ independently represents hydrogen, an alkyl group, an aryl group, an alkoxy group, a hydroxyl group, an acyl group, an acyloxy group, a carboxyl group, or an unsubstituted or substituted amino group.

Examples of alkyl groups include linear or branched alkyl groups having 1 to 8 carbon atoms and cycloalkyl groups having 6 to 8 carbon atoms, and preferred is a methyl group, an ethyl group, a t-butyl group or a cyclohexyl group. Examples of aryl groups include aryl groups having 6 to 10 carbon atoms, and preferred is a phenyl group.

Examples of alkoxy groups include groups RO— wherein R corresponds to the above-mentioned examples of alkyl groups, and preferred is a methoxy group or an ethoxy group. The acyl group may be either an aliphatic acyl group or an aromatic acyl group. Examples of aliphatic acyl groups include groups RCO— wherein R corresponds to the above-mentioned examples of alkyl groups, for example, an acetyl group. Examples of aromatic acyl groups include groups RCO— wherein R corresponds to the above-mentioned examples of aryl groups, for example, a benzoyl group. The acyloxy group may be either an aliphatic acyloxy group or an aromatic acyloxy group. Examples of aliphatic acyloxy groups include groups RCOO— wherein R corresponds to the above-mentioned examples of alkyl groups, for example, an acetoxy group. Examples of aromatic acyloxy groups include groups RCOO— wherein R corresponds to the above-mentioned examples of aryl groups, for example, a benzoxy group. The substituted amino group may be either a mono-substituted amino group or a di-substituted amino group, and examples of substituents include the above-mentioned examples of alkyl groups.

Examples of monocyclic quinone compounds or bicyclic quinone compounds having a substituent include 2-methyl-1,4-benzoquinone, 2,3-dimethyl-1,4-benzoquinone, 2,5-dimethyl-1,4-benzoquinone, 2,6-dimethyl-1,4-benzoquinone, 2-t-butyl-1,4-benzoquinone, 2,5-di-t-butyl-1,4-benzoquinone, 2-phenyl-1,4-benzoquinone, 2,5-diphenyl-1,4-benzoquinone, tetramethyl-1,4-benzoquinone, 2-methyl-1,4-naphthoquinone, 2,3-dimethyl-1,4-naphthoquinone, 2,3,5-trimethylnaphthoquinone, 2-hydroxy-1,4-naphthoquinone, 2-methoxy-1,4-naphthoquinone and 2-amino-1,4-naphthoquinone.

From the viewpoint of easy-to-use, for example, excellent solubility in the electrolyte, preferred is benzoquinone or a derivative thereof, or naphthoquinone or a derivative thereof. Especially from the viewpoint of preventing the electrolyte leakage, preferred is 1,4-naphthoquinone or a derivative thereof, such as 1,4-naphthoquinone or 2-methyl-1,4-naphthoquinone.

It is preferred that the amount of at least one compound selected from the group consisting of a monocyclic quinone compound and a bicyclic quinone compound is 0.1 to 5% by weight, based on the total weight of the electrolyte. When the amount falls in this range, the electrolyte is sufficiently prevented from leaking from both the cathode and the anode. The amount is more preferably 0.2 to 3% by weight, further preferably 0.5 to 2% by weight.

The present invention is directed to an electrolyte obtained by incorporating into an electrolyte for an electrolytic capacitor containing a tetrafluoroaluminate ion, (B)(4) a tricyclic or higher polycyclic quinone compound. The tricyclic or higher polycyclic quinone compound is preferably a tri- to pentacyclic quinone compound, more preferably a tricyclic quinone compound. The tricyclic or higher polycyclic quinone compound means a compound obtained by changing two CH atomic groups of a tricyclic or higher polycyclic aromatic compound to CO atomic groups and moving the double bonds required to form a quinoid structure, or a derivative thereof.

Examples of tricyclic or higher polycyclic quinone compounds include anthraquinone, 1,2-dihydroanthraquinone, 1,4-dihydroanthraquinone, 1,2,3,4-tetrahydroanthraquinone, 1,4,4a,9a-tetrahydroanthraquinone, 9,10-phenanthraquinone, 5,12-naphthacenequinone, 1,2-benzanthraquinone, acenaphthenequinone, and derivatives thereof.

Examples of derivatives include the above quinone compounds substituted by, for example, an alkyl group, an alkenyl group, an aryl group, an alkoxy group, a hydroxyl group, an acyl group, an acyloxy group, a carboxyl group, an alkoxycarbonyl group, an aryloxy group, or an unsubstituted or substituted amino group.

Examples of alkyl groups include linear or branched alkyl groups having 1 to 8 carbon atoms and cycloalkyl groups having 5 to 8 carbon atoms, and preferred is a methyl group, an ethyl group, a t-butyl group or a cycloalkyl group. Examples of alkenyl groups include linear or branched alkenyl groups having 2 to 8 carbon atoms. Examples of aryl groups include aryl groups having 6 to 10 carbon atoms, and preferred is a phenyl group.

Examples of alkoxy groups include groups RO— wherein R corresponds to the above-mentioned examples of alkyl groups, and preferred is a methoxy group or an ethoxy group. The acyl group may be either an aliphatic acyl group or an aromatic acyl group. Examples of aliphatic acyl groups include groups RCO— wherein R corresponds to the above-mentioned examples of alkyl groups, and preferred is an acetyl group. Examples of aromatic acyl groups include groups RCO— wherein R corresponds to the above-mentioned examples of aryl groups, and preferred is a benzoyl group. The acyloxy group may be either an aliphatic acyloxy group or an aromatic acyloxy group. Examples of aliphatic acyloxy groups include groups RCOO— wherein R corresponds to the above-mentioned examples of alkyl groups, for example, an acetoxy group. Examples of aromatic acyloxy groups include groups RCOO— wherein R corresponds to the above-mentioned examples of aryl groups, for example, a benzoxy group. Examples of alkoxy moieties in the alkoxycarbonyl group and aryl moieties in the aryloxy group include the above-mentioned examples of alkoxy groups and aryl groups. The substituted amino group may be either a mono-substituted amino group or a di-substituted amino group, and examples of substituents include the above-mentioned examples of alkyl groups.

The above substituents, for example, alkyl group (including an alkyl moiety in alkoxy and others), alkenyl group, alkoxy group, and aryl group (including an aryl moiety in aryloxy and others) may be further substituted by a hydroxyl group, and specific examples include a hydroxyethyl group and a hydroxyethoxy group.

Specific examples of tricyclic or higher polycyclic quinone compounds include anthraquinone, 2-methylanthraquinone, 2-ethylanthraquinone, 2-t-butylanthraquinone, 2-(4-methyl-3-pentyl)anthraquinone, 2-(4-methyl-3-pentenyl)anthraquinone, 2-methoxyanthraquinone, 2-ethoxyanthraquinone, 2-phenoxyanthraquinone, 2-hydroxyethoxyanthraquinone, 1-hydroxyanthraquinone, 2-hydroxyanthraquinone, anthraquinone-2-carboxylic acid, methyl anthraquinone-2-carboxylate, ethyl anthraquinone-2-carboxylate, 2-hydroxyethyl anthraquinone-2-carboxylate, 1,4-dihydroxyanthraquinone, 1,5-dihydroxyanthraquinone, 2,6-dihydroxyanthraquinone, 1,2-dihydroanthraquinone, 1,4-dihydroanthraquinone, 1,2-dimethyl-4-(2-methyl-1-propenyl)-1,4-dihydroanthraquinone, 1,2,3,4-tetrahydroanthraquinone and 1,4,4a,9a-tetrahydroanthraquinone.

It is preferred that the amount of the quinone compound is 0.1 to 5% by weight, based on the total weight of the electrolyte. When the amount falls in this range, the electrolyte is sufficiently prevented from leaking from both the cathode and the anode. The amount is more preferably 0.2 to 3% by weight, further preferably 0.5 to 2% by weight.

The present invention is directed to an electrolyte obtained by incorporating into an electrolyte for an electrolytic capacitor containing a tetrafluoroaluminate ion, (B)(5) at least one compound selected from a heteropoly acid and a salt thereof. The heteropoly acid means a condensed acid comprising oxygen and two or more elements.

Examples of heteropoly acids include silicotungstic acid, phosphotungstic acid, phosphomolybdic acid, silicomolybdic acid, silicotungstomolybdic acid, phosphotungstomolybdic acid, silicovanadotungstic acid, phosphovanadotungstic acid, phosphovanadomolybdic acid, silicovanadomolybdic acid, phosphomolybdotungstic acid, silicomolybdotungstic acid, silicovanadotungstic acid, borotungstic acid, boromolybdic acid and boromolybdotungstic acid.

The heteropoly acid can be used in the form of a salt, and examples of salts include quaternary onium salts of heteropoly acid (e.g., quaternary ammonium salts such as a tetramethylammonium salt and an ethyltrimethylammonium salt; and quaternary phosphonium salts such as a tetramethylphosphonium salt and an ethyltrimethylphosphonium salt), amine salts of heteropoly acid (e.g., primary amine salts, such as a methylamine salt, an ethylamine salt and a t-butylamine salt; secondary amine salts, such as a dimethylamine salt, an ethylmethylamine salt and a diethylamine salt; and tertiary amine salts such as a trimethylamine salt, a diethylmethylamine salt, an ethyldimethylamine salt and a triethylamine salt), and ammonium salts of heteropoly acid.

It is preferred that the amount of at least one compound selected from a heteropoly acid and a salt thereof is 0.1 to 5% by weight, based on the total weight of the electrolyte. When the amount falls in this range, the electrolyte is sufficiently prevented from leaking from both the cathode and the anode. The amount is more preferably 0.2 to 3% by weight, further preferably 0.5 to 2% by weight.

In the electrolyte for an electrolytic capacitor containing a tetrafluoroaluminate ion of the present invention, when the compounds (1) to (5) of (B) are used in combination, it is preferred that the total amount of the compounds is 0.1 to 5% by weight, based on the total weight of the electrolyte.

The electrolyte for an electrolytic capacitor containing a tetrafluoroaluminate ion in the present invention is described in, for example, Japanese Unexamined Patent Publication No. 2003-142346. Specifically, the electrolyte uses a tetrafluoroaluminate ion ($AlF_4^-$) as all of or part of the anion component, and the tetrafluoroaluminate ion in the anion component is preferably 5 to 100 mol %, more preferably 30 to 100 mol %, especially preferably 50 to 100 mol %, the most preferably 100 mol %.

A tetrafluoroaluminate ion can be contained in the form of a salt in the electrolyte. It is preferred that the tetrafluoroaluminate salt is at least one salt selected from the group consisting of a quaternary onium salt, an amine salt, an ammonium salt and an alkali metal salt.

Preferred examples of quaternary onium salts include quaternary ammonium salts, quaternary phosphonium salts, quaternary imidazolium salts and quaternary amidinium salts.

Preferred examples of quaternary ammonium ions of quaternary ammonium salts are as follows.

(i) Tetraalkylammonium

Examples include tetramethylammonium, ethyltrimethylammonium, diethyldimethylammonium, triethylmethylammonium, tetraethylammonium, trimethyl-n-propylammonium, trimethylisopropylammonium, trimethyl-n-butylammonium, trimethylisobutylammonium, trimethyl-t-butylammonium, trimethyl-n-hexylammonium, dimethyldi-n-propylammonium, dimethyldiisopropylammonium, dimethyl-n-propylisopropylammonium, methyltri-n-propylammonium, methyltriisopropylammonium, methyldi-n-propylisopropylammonium, methyl-n-propyldiisopropylammonium, triethyl-n-propylammonium, triethylisopropylammonium, triethyl-n-butylammonium, triethylisobutylammonium, triethyl-t-butylammonium, dimethyldi-n-butylammonium, dimethyldiisobutylammonium, dimethyldi-t-butylammonium, dimethyl-n-butylethylammonium, dimethylisobutylethylammonium, dimethyl-t-butylethylammonium, dimethyl-n-butylisobutylammonium, dimethyl-n-butyl-t-butylammonium, dimethylisobutyl-t-butylammonium, diethyldi-n-propylammonium, diethyldiisopropylammonium, diethyl-n-propylisopropylammonium, ethyltri-n-propylammonium, ethyltriisopropylammonium, ethyldi-n-propylisopropylammonium, ethyl-n-propyldiisopropylammonium, diethylmethyl-n-propylammonium, ethyldimethyl-n-propylammonium, ethylmethyldi-n-propylammonium, diethylmethylisopropylammonium, ethyldimethylisopropylammonium, ethylmethyldiisopropylammonium, ethylmethyl-n-propylisopropylammonium, tetra-n-propylammonium, tetraisopropylammonium, n-propyltriisopropylammonium, di-n-propyldiisopropylammonium, tri-n-propylisopropylammonium, trimethylpentylammonium, trimethylhexylammonium, trimethylheptylammonium, trimethyloctylammonium and trimethylnonylammonium. These individually have 4 to 12 carbon atoms in total, but a tetraalkylammonium having 13 or more carbon atoms in total can be used, and examples include trimethyldecylammonium, trimethylundecylammonium and trimethyldodecylammonium.

(ii) Aromatic Substituted Ammonium

Examples include aromatic substituted ammoniums having 4 to 12 carbon atoms in total, such as trimethylphenylammonium, and those having 13 or more carbon atoms in total, such as tetraphenylammonium.

(iii) Aliphatic Cyclic Ammonium

Examples include pyrrolidiniums such as N,N-dimethylpyrrolidinium, N-ethyl-N-methylpyrrolidinium, N,N-diethylpyrrolidinium and N,N-tetramethylenepyrrolidinium; piperidiniums such as N,N-dimethylpiperidinium, N-ethyl-N-methylpiperidinium, N,N-diethylpiperidinium, N,N-tetramethylenepiperidinium and N,N-pentamethylenepiperidinium; and morpholiniums such as N,N-dimethylmorpholinium, N-ethyl-N-methylmorpholinium and N,N-diethylmorpholinium. These individually have 4 to 12 carbon atoms in total, but an aliphatic cyclic ammonium having 13 or more carbon atoms in total can be used.

(iv) Ions of Nitrogen-Containing Heterocyclic Aromatic Compound

Examples include pyridiniums such as N-methylpyridinium, N-ethylpyridinium, N-n-propylpyridinium, N-isopropylpyridinium and N-n-butylpyridinium. These individually have 4 to 12 carbon atoms in total, but a pyridinium having 13 or more carbon atoms in total can be used.

Preferred examples of quaternary phosphonium ions of quaternary phosphonium salts include tetramethylphosphonium, triethylmethylphosphonium and tetraethylphosphonium. These individually have 4 to 12 carbon atoms in total, but a quaternary phosphonium having 13 or more carbon atoms in total can be used.

Preferred examples of quaternary imidazolium ions of quaternary imidazolium salts include 1,3-dimethylimidazolium, 1,2,3-trimethylimidazolium, 1-ethyl-3-methylimidazolium, 1-ethyl-2,3-dimethylimidazolium, 1,3-diethylimidazolium, 1,2-diethyl-3-methylimidazolium, 1,3-diethyl-2-methylimidazolium, 1,2-dimethyl-3-n-propylimidazolium, 1-n-butyl-3-methylimidazolium, 3-n-propyl-1,2,4-trimethylimidazolium, 1,2,3,4-tetramethylimidazolium, 1,2,3,4,5-pentamethylimidazolium, 2-ethyl-1,3-dimethylimidazolium, 1,3-dimethyl-2-n-propylimidazolium, 1,3-dimethyl-2-n-pentylimidazolium, 1,3-dimethyl-2-n-heptylimidazolium, 1,3,4-trimethylimidazolium, 2-ethyl-1,3,4-trimethylimidazolium, 1,3-dimethylbenzimidazolium, 1-phenyl-3-methylimidazolium, 1-benzyl-3-methylimidazolium, 1-phenyl-2,3-dimethylimidazolium, 1-benzyl-2,3-dimethylimidazolium, 2-phenyl-1,3-dimethylimidazolium and 2-benzyl-1,3-dimethylimidazolium. These individually are a quaternary imidazolium having 4 to 12 carbon atoms in total.

In the electrolyte of the present invention, a quaternary imidazolium having 13 or more carbon atoms in total can be used, and preferred examples include 1,3-dimethyl-2-n-undecylimidazolium and 1,3-dimethyl-2-n-heptadecylimidazolium. A quaternary imidazolium containing a hydroxyl group or an ether group can be used, and preferred examples include 2-(2'-hydroxy)ethyl-1,3-dimethylimidazolium, 1-(2'-hydroxy)ethyl-2,3-dimethylimidazolium, 2-ethoxymethyl-1,3-dimethylimidazolium and 1-ethoxymethyl-2,3-dimethylimidazolium.

Preferred examples of quaternary amidiniums include imidazoliniums such as 1,3-dimethylimidazolinium, 1,2,3-trimethylimidazolinium, 1-ethyl-3-methylimidazolinium, 1-ethyl-2,3-dimethylimidazolinium, 1,3-diethylimidazolinium, 1,2-diethyl-3-methylimidazolinium, 1,3-diethyl-2-methylimidazolinium, 1,2-dimethyl-3-n-propylimidazolinium, 1-n-butyl-3-methylimidazolinium, 3-n-propyl-1,2,4-trimethylimidazolinium, 1,2,3,4-tetramethylimidazolinium, 2-ethyl-1,3-dimethylimidazolinium, 1,3-dimethyl-2-n-propylimidazolinium, 1,3-dimethyl-2-n-pentylimidazolinium, 1,3-dimethyl-2-n-heptylimidazolinium, 1,3,4-trimethylimidazolinium, 2-ethyl-1,3,4-trimethylimidazolinium, 1-phenyl-3-methylimidazolinium, 1-benzyl-3-methylimidazolinium, 1-phenyl-2,3-dimethylimidazolinium, 1-benzyl-2,3-dimethylimidazolinium, 2-phenyl-1,3-dimethylimidazolinium and 2-benzyl-1,3-dimethylimidazolinium; and tetrahydropyrimidiniums such as 1,3-dimethyltetrahydropyrimidinium, 1,3-diethyltetrahydropyrimidinium, 1-ethyl-3-methyltetrahydropyrimidinium, 1,2,3-trimethyltetrahydropyrimidinium, 1,2,3-triethyltetrahydropyrimidinium, 1-ethyl-2,3-dimethyltetrahydropyrimidinium, 2-ethyl-1,3-dimethyltetrahydropyrimidinium, 1,2-diethyl-3-methyltetrahydropyrimidinium, 1,3-diethyl-2-methyltetrahydropyrimidinium, 5-methyl-1,5-diazabicyclo[4.3.0]nonenium-5 and 8-methyl-1,8-diazabicyclo[5.4.0]undecenium-7. These individually are a quaternary amidinium having 4 to 12 carbon atoms in total.

A quaternary amidinium having 13 or more carbon atoms in total can be used, and preferred examples include 1,3-dimethyl-2-n-undecylimidazolinium and 1,3-dimethyl-2-n-heptadecylimidazolinium. A quaternary amidinium containing a hydroxyl group or an ether group can be used, and preferred examples include 2-(2'-hydroxy)ethyl-1,3-dimethylimidazolinium, 1-(2'-hydroxy)ethyl-2,3-dimethylimidazolinium, 2-ethoxymethyl-1,3-dimethylimidazolinium and 1-ethoxymethyl-2,3-dimethylimidazolinium.

The electrolyte can contain a tetrafluoroaluminate ion in the form of not only a quaternary onium salt, but also an amine salt, an ammonium salt ($NH_4^+AlF_4^-$) or an alkali metal salt.

Preferred examples of amines for amine salt include tertiary amines such as trimethylamine, ethyldimethylamine, diethylmethylamine, triethylamine, pyridine, N-methylimidazole, 1,5-diazabicyclo[4.3.0]nonene-5 and 1,8-diazabicyclo[5.4.0]undene-7. Not only the above-mentioned tertiary amine, but also a primary amine or a secondary amine can be used, and examples include diethylamine, diisopropylamine, isobutylamine, di-2-ethylhexylamine, pyrrolidine, piperidine, morpholine, hexamethyleneimine, ethylamine, n-propylamine, isopropylamine, t-butylamine, sec-butylamine, 2-ethylhexylamine, 3-methoxypropylamine and 3-ethoxypropylamine. Preferred examples of alkali metals include lithium, sodium, potassium, rubidium and cesium.

Among these cation components, preferred is a quaternary onium having 4 to 12 carbon atoms in total from the viewpoint of obtaining an electrolyte having high electrolytic conductivity, and especially preferred is at least one compound selected from the group consisting of tetraethylammonium, triethylmethylammonium, diethyldimethylammonium, ethyltrimethylammonium, tetramethylammonium, N,N-dimethylpyrrolidinium, N-ethyl-N-methylpyrrolidinium, 1,3-dimethylimidazolium, 1,2,3-trimethylimidazolium, 1-ethyl-3-methylimidazolium, 1-ethyl-2,3-dimethylimidazolium, 1,2,3,4-tetramethylimidazolium, 1,3-diethylimidazolium, 2-ethyl-1,3-dimethylimidazolium, 1,3-dimethyl-2-n-propylimidazolium, 1,3-dimethyl-2-n-pentylimidazolium, 1,3-dimethyl-2-n-heptylimidazolium, 1,3,4-trimethylimidazolium, 2-ethyl-1,3,4-trimethylimidazolium, 1,3-dimethylbenzimidazolium, 1-phenyl-3-methylimidazolium, 1-benzyl-3-methylimidazolium, 1-phenyl-2,3-dimethylimidazolium, 1-benzyl-2,3-dimethylimidazolium, 2-phenyl-1,3-dimethylimidazolium, 2-benzyl-1,3-dimethylimidazolium, 1,3-dimethylimidazolinium, 1,2,3-trimethylimidazolinium, 1-ethyl-3-methylimidazolinium, 1-ethyl-2,3-dimethylimidazolinium, 1,2,3,4-tetramethylimidazolinium, 1,3-diethylimidazolinium, 2-ethyl-1,3-dimethylimidazolinium, 1,3-dimethyl-2-n-propylimidazolinium, 1,3-dimethyl-2-n-pentylimidazolinium, 1,3-dimethyl-2-n-heptylimidazolinium, 1,3,4-trimethylimidazolinium, 2-ethyl-1,3,4-trimethylimidazolinium, 1-phenyl-3-methylimidazolinium, 1-benzyl-3-methylimidazolinium, 1-phenyl-2,3-dimethylimidazolinium, 1-benzyl-2,3-dimethylimidazolinium, 2-phenyl-1,3-dimethylimidazolinium and 2-benzyl-1,3-dimethylimidazolinium, and further preferred is 1-ethyl-2,3-dimethylimidazolinium or 1,2,3,4-tetramethylimidazolinium.

The electrolyte can contain an anion component other than the tetrafluoroaluminate ion, and specific examples of the anion components include fluorine-containing inorganic ions such as a tetrafluoroborate ion, a hexafluorophosphate ion, a hexafluoroarsenate ion, a hexafluoroantiomonate ion, a hexafluoroniobate ion and a hexafluorotantalate ion; carboxylic acid ions such as a phthalic acid ion, a maleic acid ion, a salicylic acid ion, a benzoic acid ion and an adipic acid ion; sulfonic acid ions such as a benzenesulfonic acid ion, a toluenesulfonic acid ion, a dodecylbenzenesulfonic acid ion, a trifluoromethanesulfonic acid ion and a perfluorobutanesulfonic acid; inorganic oxo-acid ions, such as a boric acid ion and a phosphoric acid ion; and a bis(trifluoromethanesulfonyl)imide ion, a bis(pentafluoroethanesulfonyl)imide ion, a tris(trifluoromethanesulfonyl)methide ion, a perfluoroalkylborate ion and a perfluoroalkylphosphate ion. As a salt, the above salt and, for example, a hydrogenphthalate or a hydrogenmaleate can be used in combination. For example, when a tetrafluoroaluminate and a hydrogenphthalate or hydrogenmaleate are used in combination, it is preferred that the salt is comprised mainly of the tetrafluoroaluminate, and the amount of the tetrafluoroaluminate is preferably 50% by weight or more, more preferably 60% by weight or more, further preferably 70% by weight or more, based on the total weight of the salts, and the weight ratio of the tetrafluoroaluminate is preferably higher.

When used in an electrolytic capacitor, the tetrafluoroaluminate must be high in purity, and therefore the tetrafluoroaluminate to be used is purified if necessary by, for example, recrystallization or solvent extraction so that it has a desired purity.

It is preferred that the amount of the tetrafluoroaluminate ion contained in the electrolyte is 5 to 40% by weight, in terms of a tetrafluoroaluminate. When the amount falls in this range, the resultant electrolyte has excellent electrolytic conductivity and appropriate viscosity and can be prevented from suffering deposition of salt at low temperatures. The amount of the tetrafluoroaluminate ion is further preferably 10 to 35% by weight. Generally, when the electrolyte for electrolytic capacitor is reduced in concentration, the electrolyte tends to be increased in voltage proof. Therefore, the optimum concentration of the electrolyte can be determined depending on a desired rated voltage of capacitor. The electrolyte of the present invention may be either a concentrated solution containing 50% or more of a salt or an ambient-temperature molten salt.

From the viewpoint of obtaining an electrolyte having more excellent electrolytic conductivity, thermal stability and voltage proof, it is preferred that the electrolyte contains 50% by weight or more of a solvent. Examples of solvents include at least one member selected from the group consisting of a carbonic ester, a carboxylic acid ester, a phosphoric acid ester, a nitrile, an amide, a sulfone, an alcohol and water. It is preferred that the solvent is selected from a carbonic ester, a carboxylic acid ester, a phosphoric acid ester, a nitrile, an amide, a sulfone and an alcohol, which are likely to exhibit stable properties as the lapse of time when used in the electrolyte. When water is used as a solvent, it is preferred that water is used together with another solvent, namely, water is used as part of the solvent.

Specific examples of the solvents include the following:
carbonic esters such as chain carbonic esters (e.g., chain carbonates such as dimethyl carbonate, ethylmethyl carbonate, diethyl carbonate, diphenyl carbonate and methylphenyl carbonate) and cyclic carbonic esters (e.g., cyclic carbonates such as ethylene carbonate, propylene carbonate, 2,3-dimethyl ethylene carbonate, butylene carbonate, vinylene carbonate and 2-vinyl ethylene carbonate); carboxylic acid esters such as aliphatic carboxylic acid esters (e.g., methyl formate, methyl acetate, methyl propionate, ethyl acetate, propyl acetate, butyl acetate and amyl acetate), aromatic carboxylic acid esters (e.g., aromatic carboxylates such as methyl benzoate and ethyl benzoate) and lactones (e.g., γ-butyrolactone, γ-valerolactone and δ-valerolactone); phosphoric acid esters such as trimethyl phosphate, ethyldimethyl phosphate, diethylmethyl phosphate and triethyl phosphate; nitriles such as acetonitrile, propionitrile, methoxypropionitrile, glutaronitrile, adiponitrile and 2-methylglutaronitrile; amides such as N-methylformamide, N-ethylformamide, N,N-dimethylformamide, N,N-dimethylacetamide and N-methylpyrrolidinone; sulfones such as dimethyl sulfone, ethylmethyl sulfone, diethyl sulfone, sulfolane, 3-methylsulfolane and 2,4-dimethylsulfolane; alcohols such as ethylene glycol, propylene glycol, ethylene glycol monomethyl ether and ethylene glycol monoethyl ether; ethers such as ethylene glycol dimethyl ether, ethylene glycol diethyl ether, 1,4-dioxane, 1,3-dioxolane, tetrahydrofuran, 2-methyltetrahydrofuran, 2,6-dimethyltetrahydrofuran and tetrahydropyran; sulfoxides such as dimethyl sulfoxide, methylethyl sulfoxide and diethyl sulfoxide; and 1,3-dimethyl-2-imidazolidinone, 1,3-dimethyl-3,4,5,6-tetrahydro-2(1H)-pyrimidinone and 3-methyl-2-oxazolidinone.

From the viewpoint of obtaining an electrolyte having more excellent electrolytic conductivity, a non-aqueous solvent having a relative permittivity ($\in$, 25° C.) of 25 or more may be preferably used as a solvent. From the viewpoint of achieving safety, a non-aqueous solvent having a flash point of 70° C. or higher may be preferably used as a solvent.

From the viewpoint of obtaining an electrolyte having more excellent thermal stability, a solvent having a boiling point of 250° C. or higher, a melting point of −60 to 40° C., and a permittivity ($\in$, 25° C.) of 25 or more is preferably contained in an amount of 25% by weight or more, more preferably 40% by weight or more, especially preferably 50% by weight or more, based on the total weight of the solvents. Examples of the solvents include sulfone, and especially preferred is sulfolane or 3-methylsulfolane. When such a solvent is used in the electrolyte, there can be obtained an electrolytic capacitor having low impedance and high voltage proof, which is assured that it can operate for 1,000 hours or longer at an environmental temperature of 110 to 150° C.

From the viewpoint of obtaining an electrolytic capacitor having a lower impedance, a solvent having a boiling point of 190 to lower than 250° C., a melting point of −60 to 40° C., and a permittivity ($\in$, 25° C.) of 25 or more is preferably contained in an amount of 25% by weight or more, more preferably 40% by weight or more, especially preferably 50% by weight or more, based on the total weight of the solvents. Examples of the solvents include carbonic esters, carboxylic acid esters, phosphoric acid esters, nitrites, amides and alcohols, and especially preferred is γ-butyrolactone or ethylene glycol. When such a solvent is used in the electrolyte, an electrolytic capacitor having extremely low impedance and high voltage proof can be obtained.

From the viewpoint of achieving excellent thermal stability, the electrolyte preferably contains sulfolane as a solvent and 1-ethyl-2,3-dimethylimidazolinium tetrafluoroaluminate or 1,2,3,4-tetramethylimidazolinium tetrafluoroaluminate in an amount of 5 to 40% by weight, based on the total weight of the electrolyte. From the viewpoint of obtaining an electrolytic capacitor having a low impedance, the electrolyte preferably contains γ-butyrolactone as a solvent and 1-ethyl-2,3-dimethylimidazolinium tetrafluoroaluminate or 1,2,3,4-tetramethylimidazolinium tetrafluoroaluminate in an amount of 5 to 40% by weight, based on the weight of the electrolyte. Sulfolane and γ-butyrolactone are preferably used in combination as a solvent.

In addition to the salt and solvent, an additive can be added to the electrolyte. An additive is added to the electrolyte for various purposes, for example, improvement of the electrolytic conductivity, improvement of the thermal stability, prevention of the deterioration of electrode due to hydration or dissolution, suppression of gas generation, improvement of the voltage proof, or improvement of the wettability. With respect to the content of the additive in the electrolyte, there is no particular limitation, but the content is preferably in the range of 0.1 to 20% by weight, more preferably in the range of 0.5 to 10% by weight.

Examples of additives include m-nitroacetophenone, p-nitrobenzoic acid; phosphorus compounds such as dibutyl phosphate, monobutyl phosphate, dioctyl phosphate, monooctyl octylphosphonate and phosphoric acid; boron compounds, such as a complex compound of boric acid and a polyhydric alcohol (e.g., ethylene glycol, glycerol, mannitol or polyvinyl alcohol); metal oxide particles such as silica and aluminosilicate; polyalkylene glycol such as polyethylene glycol and polypropylene glycol, and copolymers thereof; and surfactants such as silicone oil. In the electrolyte containing at least one compound selected from the compounds (2) to (5) of (B), a nitrophenol, for example, p-nitrophenol can be used.

The electrolyte can be used in the form of what is called gelled electrolyte obtained by solidification by adding a polymer compound to the electrolyte. Examples of polymers used in the gelled electrolyte include polyethylene oxide, polyacrylonitrile, polytetrafluoroethylene, polyvinylidene fluoride and polymethyl methacrylate.

From the viewpoint of achieving excellent life properties, it is preferred that the moisture content of the electrolyte is smaller. Specifically, the moisture content is preferably controlled to be 1% by weight or less, more preferably 0.01 to 1% by weight, further preferably 0.01 to 0.1% by weight.

In the electrolyte containing at least one compound selected from the compounds (3) to (5) of (B), the influence of moisture is reduced, and, for example, even when the electrolyte has a moisture content in the range of 0.01 to 3% by weight, excellent properties can be maintained.

In the present invention, there is provided an electrolytic capacitor using the electrolyte of the present invention. Examples of electrolytic capacitors include an aluminum electrolytic capacitor, a tantalum electrolytic capacitor and a niobium electrolytic capacitor, and especially preferred is an aluminum electrolytic capacitor. With respect to the structure of and materials for the electrolytic capacitor, there is no particular limitation as long as the electrolyte of the present invention is used. Therefore, all the electrolytic capacitors conventionally used and electrolytic capacitors newly proposed, which use the electrolyte of the present invention, are encompassed by the present invention.

Figure 2:
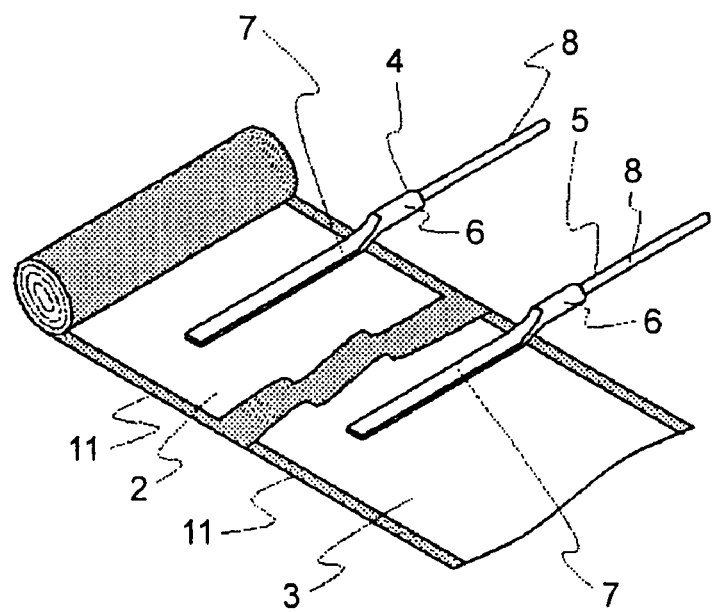
FIG. 2 Exploded perspective view showing the structure of a capacitor element.

As a representative example, an aluminum electrolytic capacitor having the structure shown in FIGS. 1 and 2 is described below.

The aluminum electrolytic capacitor is produced as follows. Capacitor element 1 is first formed by spirally winding anode foil 2 and cathode foil 3 together with separator 11 disposed between the anode foil and the cathode foil. As shown in FIG. 2, lead wire 4 and lead wire 5 which are respectively an anode lead means and a cathode lead means, are connected to anode foil 2 and cathode foil 3, respectively. Each of lead wire 4 and lead wire 5 comprises connector 7 for connection with each foil, round bar portion 6 unified with connector 7, and external connector 8 welded to round bar portion 6. The lead wire is mechanically connected to each foil by, for example, stitch welding or ultrasonic welding.

Capacitor element 1 as described above is impregnated with the electrolyte of the present invention, and placed in closed-end cylinder casing 10 comprised of aluminum, and closure 9 having through-holes through which lead wires 4, 5 are electrically introduced to the outside is inserted into the opening end of casing 10, and then the end of casing 10 is subjected to drawing to seal the electrolytic capacitor, thus obtaining an aluminum electrolytic capacitor.

Constituents of the aluminum electrolytic capacitor are individually described below in detail. With respect to the anode foil, there is no particular limitation. For example, there can be used an anode foil obtained by chemically or electrochemically etching an aluminum foil having a purity of 99.9% or higher in an acidic solution to increase the surface area, and then subjecting the resultant aluminum foil to formation in a phosphate formation electrolyte containing, for example, ammonium dihydrogenphosphate or diammonium hydrogenphosphate, a borate formation electrolyte containing, for example, ammonium borate, or an adipate formation electrolyte containing, for example, ammonium adipate as a solute to form an aluminum oxide film layer on the surface of the aluminum foil.

With respect to the cathode foil, there is no particular limitation, and there can be used, for example, a cathode foil obtained by etching an aluminum foil having a purity of 99.9% or higher in the same manner as in the anode foil. Alternatively, a cathode foil having formed on part of or all of the surface thereof a film comprised of a metal nitride or a metal can be used. Such a cathode foil is described in, for example, Japanese Unexamined Patent Publication No. 2004-165203. Specifically, examples of metal nitrides include titanium nitride, zirconium nitride, tantalum nitride and niobium nitride, and examples of metals include titanium, zirconium, tantalum, and niobium, and the film comprised of a metal nitride or a metal has a thickness of, for example, 0.02 to 0.1 μm. A cathode foil comprised of aluminum having a purity of less than 99.9% and containing at least one metal selected from copper, iron, manganese, tin and titanium can be used in combination with a cathode lead means using aluminum having a purity of 99.9% or higher. Such a cathode foil is described in, for example, Japanese Unexamined Patent Publication No. 2004-165204.

With respect to the separator, there is no particular limitation, and paper such as manila paper or kraft paper can be used. In the separator, nonwoven fabric comprised of, for example, glass fiber, polypropylene or polyethylene can be used.

With respect to the lead wire as an anode lead means and the lead wire as a cathode lead means, there is no particular limitation, and they can be prepared as follows. An aluminum wire material intermittently pressed is cut into a predetermined size to form an aluminum conductor comprising a round bar portion and a connector, and then the aluminum conductor is subjected to formation to form an anode oxide film on the surface of the conductor. Then, an external connector comprised of a copper-plated steel wire (CP wire) is welded to the end of the resultant aluminum conductor. In the electrode lead means, aluminum having a purity of 99.9% or higher can be used From the viewpoint of preventing the electrolyte leakage, it is preferred that the aluminum for electrode lead means has a purity equivalent to or higher than that of the electrode foil.

For surely preventing the electrolytic capacitor from suffering electrolyte leakage, it is preferred that the lead wire as a cathode lead means is processed so that it has a ceramic coating layer and/or an insulating synthetic resin layer at the portion in contact with the closure when the capacitor element is placed and sealed in a casing. Such processing is described in, for example, Japanese Unexamined Patent Publication Nos. 2004-165206 and 2004-165207.

The ceramic coating layer on the lead wire as a cathode lead means can be formed by, for example, applying a coating composition comprising a metal alkoxide ceramic to the round bar portion of the above-mentioned aluminum conductor having an anode oxide film formed on the surface thereof, and then subjecting the applied composition to heat treatment, and further applying the coating composition and then subjecting it to heat treatment.

Examples of ceramics used in the metal alkoxide ceramic include $Al_2O_3$, $SiO_2$, $ZrO_2$, $TiO_2$, MgO, $H_3BO_3$, $Cr_2O_3$, $BaTiO_3$, $PbTiO_3$ and $KTaO_3$. From the viewpoint of achieving excellent coating properties, the ceramic to be used is preferably at least one member selected from $Al_2O_3$, $SiO_2$ and $ZrO_2$. Further, from the viewpoint of achieving excellent strength, a mixture of $Al_2O_3$ and $SiO_2$ is preferably used.

In forming the insulating synthetic resin layer on the lead wire as a cathode lead means, as an insulating synthetic resin material, a thermosetting resin such as an epoxy, phenolic, furan, melamine, xylene or guanamine resin, or a thermoplastic resin such as a fluorine, butadiene, polyamide, polyamideimide, polyacrylate, polyimide, polyether imide, polyether ether ketone, polycarbonate, polyvinyl formal, polyphenylene sulfide, liquid crystalline polymer, ketone, coumarone or MBS resin can be used. In the insulating synthetic resin material, for example, a silane or titanate coupling agent can be incorporated in an amount of 10% by weight or less.

The insulating synthetic resin layer can be formed on the aluminum conductor by applying to round bar portion of the above aluminum conductor having an anode oxide film formed on the surface thereof a coupling agent and drying it to form a coupling agent layer and then, or, without applying a coupling agent, applying to the round bar portion a coating composition comprising a liquid melted material of an insulating synthetic resin formed by heating or using an appropriate solvent, and then drying the coating composition applied. Alternatively, the insulating synthetic resin layer can be formed by applying a shaped article of a heat-melting synthetic resin film to the round bar portion and then subjecting it to heat treatment.

In the present invention, from the viewpoint of preventing the electrolyte leakage, it is preferred that a ceramic coating layer or an insulating synthetic resin layer is formed on at least one of the lead wire as a cathode lead means and the lead wire as an anode lead means by the similar treatment. The thickness of these layers can be 5 to 30 μm, preferably 10 to 20 μm.

The capacitor element as described above is impregnated with the electrolyte of the present invention, and can be placed and sealed in a casing. In the present invention, for repairing the crack or damaged portion of the oxide film layer on the surface of the anode foil, it is preferred that, before being impregnated with the electrolyte, the capacitor element is immersed in a formation electrolyte for repair formation.

With respect to the formation electrolyte for repair formation, there is no particular limitation, and a formation electrolyte for use in the formation of anode foil can be used. Specific examples include phosphate formation electrolytes containing, for example, ammonium dihydrogenphosphate or diammonium hydrogenphosphate, borate formation electrolytes containing, for example, ammonium borate, or adipate formation electrolytes containing, for example, ammonium adipate as a solute. Of these, a phosphate formation electrolyte is preferably used. The concentration of the formation electrolyte can be the concentration of the formation electrolyte conventionally used in the formation of anode foil, and, for example, an aqueous solution containing an electrolyte in an amount of 0.01 to 1% by weight can be used. The formation electrolyte for repair formation may be either the same as or different from the formation electrolyte used in the formation of anode foil of the capacitor element.

The repair formation can be performed by a known method, for example, by impregnating the capacitor element with a formation electrolyte and then applying a voltage to the anode. The repair formation can be performed at a rated voltage or higher and at a voltage for the formation of anode foil or lower, and the formation time can be 5 to 120 minutes.

It is preferred that the capacitor element which has been subjected to repair formation is washed and dried and then impregnated with the electrolyte.

The capacitor element impregnated with the electrolyte is placed in a casing, and an opening portion of the casing is sealed up. For example, the capacitor element is placed in a closed-end cylinder casing comprised of aluminum, and a closure made of a butyl rubber is inserted into the opening end of the casing, and further the end of the casing is subjected to drawing to seal the electrolytic capacitor, thus obtaining an aluminum electrolytic capacitor. It is further preferred that the surface of the closure is coated with, for example, a fluororesin or a sheet of, for example, a phenolic resin is attached to the surface of the closure since the permeability to solvent vapor is reduced. The thus obtained electrolytic capacitor can be then subjected to reformation if necessary.

In the aluminum electrolytic capacitor using the electrolyte for an electrolytic capacitor containing a tetrafluoroaluminate ion, the self-potential of the cathode is lower and markedly shifts toward lower potential side with the lapse of time and the self-potential of the anode is likely to shift toward lower potential side, as compared to those of a conventional aluminum electrolytic capacitor using an electrolyte containing, for example, a quaternary ammonium salt of phthalic acid. Therefore, the round bar portion of the lead wire is noble, as compared to the electrode foil, and the formation of a hydroxide due to an oxidation-reduction reaction at this portion is likely to cause electrolyte leakage, changing the properties of the electrolytic capacitor. Further, the conventional aluminum electrolytic capacitor is used in such a low voltage region that the rated voltage is 35 V or less, whereas the aluminum electrolytic capacitor using the electrolyte containing a tetrafluoroaluminate ion can be used in such a high voltage region that the rated voltage is 100 V, and further meets the requirement of high heat resistance, and hence the latter capacitor is affected by the moisture content of the electrolyte.

However, it is found that, when using an electrolyte obtained by incorporating at least one compound selected from the compounds (3) to (5) of (B) into the electrolyte for an electrolytic capacitor containing a tetrafluoroaluminate ion, all the above tendencies can be appropriately controlled.

For example, with respect to the quinone compound, it is presumed that a reaction of the quinone compound is more likely to proceed than the oxidation-reduction reaction at the round bar portion of the lead wire and hence inhibits the generation of a hydroxide to prevent electrolyte leakage. Further, it is presumed that the electrolyte of the present invention can control the self-potential of aluminum in higher potential side and hence can stabilize the potential, so that a reaction of the quinone compound stably proceeds.

Specifically, the electrolyte for an electrolytic capacitor according to another embodiment of the present invention is an electrolyte for an electrolytic capacitor containing a tetrafluoroaluminate ion, which has a self-potential of −0.95 V or more with respect to the cathode (aluminum). The self-potential can be controlled to be preferably in the range of −0.95 to −0.50 V, more preferably −0.90 to −0.55 V. In the electrolytic capacitor using the electrolyte of the present invention, the effect of the moisture content is reduced, and, even when the moisture content of the electrolyte is 0.01 to 5% by weight, the self-potential can be in the above-mentioned range. The self-potential means a value immediately after immersing aluminum (purity: 99.99%; thickness: 1 mm) in the electrolyte as measured by a potentiostat using $I_3^-/I^-$ as a reference electrode. The electrolyte for an electrolytic capacitor of the present invention can prevent the self-potential of the cathode (aluminum) from descending with the lapse of time.

It is preferred that the cathode foil has formed on part of or all of the surface thereof a film comprised of a metal nitride or a metal. In this case, the self-potential of the electrode foil can be kept high. It is preferred that the anode lead means and/or the cathode lead means has a ceramic coating layer and/or an insulating synthetic resin layer at least part of the portion in contact with the closure. In this case, the reaction at the round bar portion of the lead wire can be inhibited, thus preventing electrolyte leakage.

Hereinabove, the present invention is described with reference to the aluminum electrolytic capacitor shown in FIGS. 1 and 2 as an example, but the present invention is not limited to this. The materials, forms, amounts, ratios, procedure and others in the above descriptions can be appropriately changed as long as the aim of the present invention is not sacrificed.

EXAMPLES

Hereinbelow, the present invention will be described in more detail with reference to the following Examples, which should not be construed as limiting the scope of the present invention. The materials, amounts, ratios, procedure and others in the Examples can be appropriately changed as long as the aim of the present invention is not sacrificed.

Electrolytic capacitors in the Examples were individually produced as follows.

An anode foil and a cathode foil were spirally wound together with a separator disposed between the anode foil and the cathode foil to form a capacitor element.

As an anode foil, there was used one obtained by etching an aluminum foil having a purity of 99.9% to increase the surface area and then subjecting the resultant aluminum foil to formation to form an anode oxide film layer on the surface of the aluminum foil. As a cathode foil, one obtained by etching an aluminum foil having a purity of 99.9% in the same manner as in the anode foil was used.

As a cathode lead means and an anode lead means, a lead wire comprising a connector for connection with the electrode foil, a round bar portion unified with the connector, and an external connector welded to the end of the round bar portion was prepared. The connector and round bar portion of the lead wire are individually comprised of 99.9% aluminum, and the external connector is comprised of a CP wire. The round bar portion of the lead wire has formed on the surface thereof a ceramic coating layer having a thickness of 15 μm using a coating composition comprising metal alkoxide ceramics of $Al_2O_3$ and $SiO_2$.

These lead wires were connected to the respective electrode foils at connectors 7.

The capacitor element was impregnated with each of the electrolytes in the Examples and Comparative Examples, and placed in a closed-end cylinder casing comprised of aluminum, and a closure comprised of a peroxide vulcanized butyl rubber was inserted into the opening portion of the casing and further the end of the casing was subjected to drawing to hermetically seal the casing, followed by reformation, thus obtaining an electrolytic capacitor (rated voltage: 6.3 V; capacitance: 220 μF; size: ϕ6.3×6 L).

Measurement of Electrolyte Leakage

With respect to the electrolyte leakage in an electrolytic capacitor, a method for measurement is as follows. The electrolytic capacitor was allowed to stand at 85° C./85% RH for 500 hours or 1,000 hours, and then electrolyte leakage was evaluated in accordance with the "Standards" of Appendix 2 of EIAJ RC-2372. The occurrence of electrolyte leakage corresponds to criterion C or D in the Standards.

Examples 1 to 9 and Comparative Example 1

1-Ethyl-2,3-dimethylimidazolinium tetrafluoroaluminate was dissolved in γ-butyrolactone to prepare an electrolyte having a concentration of 25% by weight. Relative to 100% by weight of the electrolyte prepared, the substances shown in Table 1 were individually added (not added in Comparative Example 1) to prepare electrolytes, and electrolytic capacitors in Examples 1 to 9 and Comparative Example 1 were individually produced.

TABLE 1

| | Number of electrolytic capacitors in which electrolyte leakage occurred (N = 20) | | | |
| --- | --- | --- | --- | --- |
| | Cathode | | Anode | |
| | 500 Hours | 1000 Hours | 500 Hours | 1000 Hours |
| Example 1 Acridine (Amount: 2 wt %) | 0 | 2 | 0 | 4 |
| Example 2 N-(Cyclohexylthio)-phthalimide (Amount: 1 wt %) | 0 | 6 | 0 | 2 |
| Example 3 p-Nitrophenol (Amount: 1 wt %) | 0 | 4 | 0 | 2 |
| Example 4 Dimethylglyoxime (Amount: 2 wt %) | 0 | 6 | 0 | 2 |
| Example 5 o-Aminobenzoic acid (Amount: 2 wt %) | 0 | 6 | 0 | 2 |
| Example 6 Tris(8-quinolinolato) aluminum (Amount: 0.5 wt %) | 0 | 4 | 0 | 0 |
| Example 7 Triisopropyl borate (Amount: 1 wt %) | 0 | 10 | 0 | 2 |
| Example 8 Tri-n-amyl borate (Amount: 1 wt %) | 0 | 12 | 0 | 0 |
| Example 9 Tetraethyl orthosilicate (Amount: 2 wt %) | 0 | 10 | 0 | 2 |
| Comparative Example 1 | 4 | 14 | 0 | 8 |

As is apparent from the above results, the electrolyte of the present invention is prevented from leaking from both the cathode and the anode in the electrolytic capacitor.

Examples 10 to 27 and Comparative Examples 2 to 4

1-Ethyl-2,3-dimethylimidazolinium tetrafluoroaluminate was dissolved individually in the solvents shown in Table 2 to prepare electrolytes each having a concentration of 25% by weight. Relative to 100% by weight of each electrolyte prepared, the compounds of the types and amounts and the moisture shown in Table 1 were individually added to obtain electrolytes in Examples 10 to 27 and Comparative Examples 2 to 4. Aluminum (purity: 99.99%; thickness: 1 mm) was immersed in each of these electrolytes, and a self-potential was measured by a potentiostat (HZ3000; Hokuto Denko Corporation) and using an $I_3^-/I^-$ as a reference electrode. The results are shown in Table 2.

TABLE 2

| | Compound | Amount (wt %) | Solvent | Moisture content (wt %) | Self-potential of aluminum V vs. $I_3^-/I^-$ |
| --- | --- | --- | --- | --- | --- |
| Example 10 | 1,4-Benzoquinone | 1% | GBL | 0.1% | −0.77 |
| Example 11 | 2-t-Butyl-1,4-benzoquinone | 1% | GBL | 0.1% | −0.62 |
| Example 12 | 2-Phenyl-1,4-benzoquinone | 1% | GBL | 0.1% | −0.60 |
| Example 13 | 2,5-Diphenyl-1,4-benzoquinone | 0.5% | GBL | 0.1% | −0.67 |
| Example 14 | 1,4-Naphthoquinone | 0.5% | GBL | 0.1% | −0.73 |
| Example 15 | 1,4-Naphthoquinone | 1% | GBL | 3% | −0.73 |
| Example 16 | 1,4-Naphthoquinone | 1% | SLF + GBL | 0.1% | −0.66 |
| Example 17 | 1,4-Naphthoquinone | 1% | GBL | 0.1% | −0.66 |
| Example 18 | 1,4-Naphthoquinone | 3% | GBL | 0.1% | −0.82 |

TABLE 2-continued

| | Compound | Amount (wt %) | Solvent | Moisture content (wt %) | Self-potential of aluminum V vs. $I_3^-/I^-$ |
|---|---|---|---|---|---|
| Example 19 | 2-Methyl-1,4-naphthoquinone | 1% | GBL | 0.1% | −0.88 |
| Example 20 | 2-Hydroxy-1,4-naphthoquinone | 1% | GBL | 0.1% | −0.70 |
| Example 21 | 2-Methoxy-1,4-naphthoquinone | 1% | GBL | 0.1% | −0.82 |
| Example 22 | 1,2-Naphthoquinone | 1% | GBL | 0.1% | −0.57 |
| Example 23 | Anthraquinone | 0.5% | GBL | 0.1% | −0.85 |
| Example 24 | 2-Methylanthraquinone | 0.5% | GBL | 0.1% | −0.85 |
| Example 25 | Acenaphthenequinone | 0.5% | GBL | 0.1% | −0.85 |
| Example 26 | Phosphomolybdic acid | 1% | GBL | 0.1% | −0.71 |
| Example 27 | Phosphotungstic acid | 1% | GBL | 0.1% | −0.79 |
| Comparative Example 2 | None | — | GBL | 0.1% | −1.09 |
| Comparative Example 3 | None | — | GBL | 3% | −1.50 |
| Comparative Example 4 | None | — | SLF + GBL | 0.1% | −1.02 |

GBL: γ-Butyrolactone
SLF + GBL: Mixed solvent of sulfolane and γ-butyrolactone in 2:1 weight ratio With respect to each of Examples 10 and 23 and Comparative Example 2, a self-potential of aluminum was similarly measured after 5 minutes. As a result, in Example 10, the potential was −0.71 V and a change was +0.06 V. In Example 23, the potential was −0.84 V and a change was +0.01 V. While, in Comparative Example 2, the potential was −1.29 V and a change was −0.20 V. As apparent from these results, the electrolyte of the present invention can control the self-potential of aluminum in higher potential side.

With respect to each of the electrolytes in Examples 10, 15, 19, 23, 24, 26 and 27 and Comparative Example 2, an electrolytic capacitor was produced in the same manner as in the above-mentioned procedure, and measurement for electrolyte leakage was conducted. The results are shown in Table 3.

TABLE 3

| | Number of electrolytic capacitors in which electrolyte leakage occurred (n = 20) | | | |
|---|---|---|---|---|
| | Cathode | | Anode | |
| | 500 Hours | 1000 Hours | 500 Hours | 1000 Hours |
| Example 10 | 0 | 0 | 0 | 0 |
| Example 15 | 0 | 0 | 0 | 0 |
| Example 19 | 0 | 0 | 0 | 0 |
| Example 23 | 0 | 0 | 0 | 0 |
| Example 24 | 0 | 0 | 0 | 0 |
| Example 26 | 0 | 0 | 0 | 0 |
| Example 27 | 0 | 0 | 0 | 0 |
| Comparative Example 2 | 4 | 14 | 0 | 8 |

As is apparent from the above results, the electrolyte of the present invention is prevented from leaking from both the cathode and the anode in the electrolytic capacitor.

The invention claimed is:

1. An electrolyte for an electrolytic capacitor, which comprises:
   (A) a tetrafluoroaluminate ion, and
   (B) at least one compound selected from the group consisting of:
   (1) at least one compound selected from the group consisting of a phthalimide, a quinoline, a dioxime, and an amino group-containing aromatic carboxylic acid;
   (2) at least one compound selected from the group consisting of an aluminum complex, a boric acid ester and a silicic acid ester;
   (3) at least one compound selected from the group consisting of a monocyclic quinone compound and a bicyclic quinone compound;
   (4) a tricyclic or higher polycyclic quinone compound; and
   (5) at least one compound selected from a heteropoly acid and a salt thereof.

2. The electrolyte for an electrolytic capacitor according to claim 1, which comprises:
   (A) a tetrafluoroaluminate ion, and
   (B) at least one compound selected from the group consisting of:
   (1) at least one compound selected from the group consisting of a phthalimide, a quinoline, a dioxime, and an amino group-containing aromatic carboxylic acid; and
   (2) at least one compound selected from the group consisting of an aluminum complex, a boric acid ester and a silicic acid ester.

3. The electrolyte for an electrolytic capacitor according to claim 1, which comprises:
   (A) a tetrafluoroaluminate ion, and
   (B) at least one compound selected from the group consisting of:
   (3) at least one compound selected from the group consisting of a monocyclic quinone compound and a bicyclic quinone compound;
   (4) a tricyclic or higher polycyclic quinone compound; and
   (5) at least one compound selected from a heteropoly acid and a salt thereof.

4. The electrolyte for an electrolytic capacitor according to claim 1, which comprises:
   (A) a tetrafluoroaluminate ion, and
   (B)(1) at least one compound selected from the group consisting of a phthalimide, a quinoline, a dioxime, and an amino group-containing aromatic carboxylic acid.

5. The electrolyte for an electrolytic capacitor according to claim 4, wherein the phthalimide is present and is a compound represented by the following formula (1):

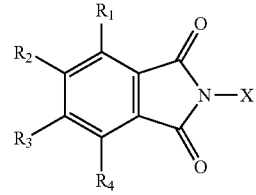

wherein X represents hydrogen, an alkyl group, a hydroxyl group, an alkoxy group or an alkylthio group, and each of $R_1$ to $R_4$ independently represents hydrogen, an alkyl group or a hydroxyl group.

6. The electrolyte for an electrolytic capacitor according to claim 4, wherein the quinoline is present and is a compound represented by the following formula (2):

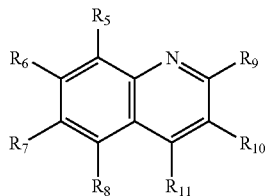

wherein each of $R_5$ to $R_8$ independently represents hydrogen, an alkyl group or a hydroxyl group, and each of $R_9$ to $R_{11}$ independently represents hydrogen, an alkyl group, an alkenyl group or a hydroxyl group, and two adjacent substituents in $R_9$ to $R_{11}$ together with the carbon atoms to which they are bonded may form a ring structure.

7. The electrolyte for an electrolytic capacitor according to claim 4, wherein the dioxime is present and is glyoxime, methylglyoxime, dimethylglyoxime, ethylmethylglyoxime, diethylglyoxime, diphenylglyoxime, diaminoglyoxime, 1,2-benzoquinone dioxime, 1,4-benzoquinone dioxime, 1,2-cyclohexanedione dioxime or 1,4-cyclohexanedione dioxime.

8. The electrolyte for an electrolytic capacitor according to claim 4, wherein the amino group-containing aromatic carboxylic acid is present and is o-, m- or p-aminobenzoic acid, 3-amino-2-naphthoic acid or 6-amino-2-naphthoic acid.

9. The electrolyte for an electrolytic capacitor according to claim 4, which comprises at least one compound selected from the group consisting of a phthalimide, a quinoline, a dioxime, and an amino group-containing aromatic carboxylic acid in an amount of 0.1 to 5% by weight, based on the total weight of the electrolyte.

10. The electrolyte for an electrolytic capacitor according to claim 1, which comprises:
(A) a tetrafluoroaluminate ion, and
(B)(2) at least one compound selected from the group consisting of an aluminum complex, a boric acid ester and a silicic acid ester.

11. The electrolyte for an electrolytic capacitor according to claim 10, wherein the aluminum complex is present and is an acetylacetonato complex, an 8-quinolinolato complex, an ethylacetoacetato complex, an oxalato complex, or a bis(ethylacetoacetato)(acetylacetonato).

12. The electrolyte for an electrolytic capacitor according to claim 10, wherein the boric acid ester is present and is a lower alkyl ester having 1 to 6 carbon atoms of boric acid.

13. The electrolyte for an electrolytic capacitor according to claim 10, wherein the silicic acid ester is present and is a lower alkyl ester having 1 to 6 carbon atoms of silicic acid.

14. The electrolyte for an electrolytic capacitor according to claim 10, which comprises at least one compound selected from the group consisting of an aluminum complex, a boric acid ester and a silicic acid ester in an amount of 0.1 to 5% by weight, based on the total weight of the electrolyte.

15. The electrolyte for an electrolytic capacitor according to claim 1, which comprises:

(A) a tetrafluoroaluminate ion, and
(B)(3) at least one compound selected from the group consisting of a monocyclic quinone compound and a bicyclic quinone compound.

16. The electrolyte for an electrolytic capacitor according to claim 15, wherein the monocyclic quinone compound is benzoquinone or a derivative thereof and the bicyclic quinone compound is naphthoquinone or a derivative thereof.

17. The electrolyte for an electrolytic capacitor according to claim 16, wherein the benzoquinone or derivative thereof is a compound represented by the following formula (I):

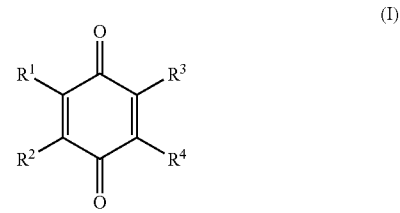

wherein each of $R^1$ to $R^4$ independently represents hydrogen, an alkyl group, an aryl group, an alkoxy group, a hydroxyl group, an acyl group, an acyloxy group, a carboxyl group, or an unsubstituted or substituted amino group,
and the naphthoquinone or derivative thereof is a compound represented by the following formula (II):

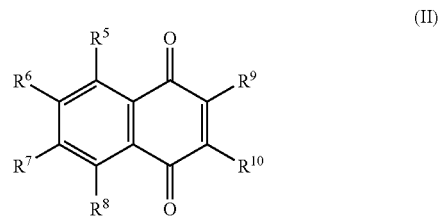

wherein each of $R^5$ to $R^{10}$ independently represents hydrogen, an alkyl group, an aryl group, an alkoxy group, a hydroxyl group, an acyl group, an acyloxy group, a carboxyl group, or an unsubstituted or substituted amino group.

18. The electrolyte for an electrolytic capacitor according to claim 15, which comprises at least one compound selected from the group consisting of a monocyclic quinone compound and a bicyclic quinone compound in an amount of 0.1 to 5% by weight, based on the total weight of the electrolyte.

19. The electrolyte for an electrolytic capacitor according to claim 1, which comprises:
(A) a tetrafluoroaluminate ion, and
(B)(4) a tricyclic or higher polycyclic quinone compound.

20. The electrolyte for an electrolytic capacitor according to claim 19, which comprises the tricyclic or higher polycyclic quinone compound in an amount of 0.1 to 5% by weight, based on the total weight of the electrolyte.

21. The electrolyte for an electrolytic capacitor according to claim 19, wherein the tricyclic or higher polycyclic quinone compound is anthraquinone, 2-methylanthraquinone, acenaphthenequinone or a derivative thereof.

22. The electrolyte for an electrolytic capacitor according to claim 1, which comprises:
(A) a tetrafluoroaluminate ion, and
(B)(5) at least one compound selected from a heteropoly acid and a salt thereof.

23. The electrolyte for an electrolytic capacitor according to claim 22, which comprises at least one compound selected from a heteropoly acid and a salt thereof in an amount of 0.1 to 5% by weight, based on the total weight of the electrolyte.

24. The electrolyte for an electrolytic capacitor according to claim 22, wherein the heteropoly acid is phosphomolybdic acid or phosphotungstic acid.

25. An electrolyte for an electrolytic capacitor containing a tetrafluoroaluminate ion, which has a self-potential of −0.95 V or more with respect to aluminum in the electrolyte, relative to an $I_3^-/I^-$ reference electrode.

26. The electrolyte for an electrolytic capacitor according to claim 25, which has a moisture content of 0.01 to 5% by weight.

27. The electrolyte for an electrolytic capacitor according to claim 1, which comprises the tetrafluoroaluminate ion in the form of at least one tetrafluoroaluminate salt selected from the group consisting of a quaternary onium salt, an amine salt, an ammonium salt and an alkali metal salt.

28. An electrolytic capacitor comprising:
 a capacitor element which comprises an anode foil with an anode lead means and a cathode foil with a cathode lead means being spirally wound together with a separator disposed therebetween, the capacitor element being impregnated with the electrolyte according to claim 1;
 a casing for containing therein the capacitor element; and
 a closure for sealing up an opening portion of the casing.

29. The electrolytic capacitor according to claim 28, wherein the cathode foil has formed on part of or all of the surface thereof a film comprised of a metal nitride or a metal.

30. The electrolytic capacitor according to claim 28, wherein at least one of the anode lead means and the cathode lead means has at least one of a ceramic coating layer and an insulating synthetic resin layer at least part which layer is in contact with the closure.

31. The electrolytic capacitor according to claim 28, wherein the capacitor element comprises an anode foil with an anode lead means and a cathode foil with a cathode lead means being spirally wound via a separator, the capacitor element being immersed in a formation electrolyte for repair formation before being impregnated with the electrolyte.

32. The electrolytic capacitor according to claim 28, which is an aluminum electrolytic capacitor.

* * * * *